US010896032B2

(12) United States Patent
Giba et al.

(10) Patent No.: US 10,896,032 B2
(45) Date of Patent: Jan. 19, 2021

(54) SYSTEM AND METHOD FOR CERTIFYING AND DEPLOYING INSTRUCTION CODE

(71) Applicant: Accenture Global Solutions Limited, Dublin (IE)

(72) Inventors: Michael Thomas Giba, San Francisco, CA (US); Teresa Sheausan Tung, San Jose, CA (US); Jean-Luc Chatelain, Atlanta, GA (US); Ishmeet Singh Grewal, Dublin, CA (US)

(73) Assignee: ACCENTURE GLOBAL SOLUTIONS, LIMITED, Dublin (IE)

( * ) Notice: Subject to any disclaimer, the term of this patent is extended or adjusted under 35 U.S.C. 154(b) by 0 days.

(21) Appl. No.: 16/179,466

(22) Filed: Nov. 2, 2018

(65) Prior Publication Data
US 2020/0142678 A1    May 7, 2020

(51) Int. Cl.
*G06F 8/60*     (2018.01)
*G06Q 20/10*    (2012.01)
*H04L 29/06*    (2006.01)

(52) U.S. Cl.
CPC .............. *G06F 8/60* (2013.01); *G06Q 20/10* (2013.01); *H04L 63/0442* (2013.01)

(58) Field of Classification Search
CPC ........ G06F 8/60; G06Q 20/10; H04L 63/0442
See application file for complete search history.

(56) References Cited

U.S. PATENT DOCUMENTS 6,647,795 B2 * 11/2003 Suzuki .................... G01L 1/144
                                                            73/718
7,761,910 B2 *  7/2010 Ransom ................ H04L 67/125
                                                            726/6

(Continued)

FOREIGN PATENT DOCUMENTS

| CN | 103297413 B | * | 2/2018 | ........... H04L 9/0894 |
| CN | 108628745 A | | 10/2018 | |
| EP | 1494429 B1 | * | 5/2012 | ........... H04L 63/168 |

OTHER PUBLICATIONS

Barbi et al., "A Model-driven Approach for Configuring and Deploying Systems of Systems", Jan. 24, 2013, IEEE (Year: 2013).*

(Continued)

*Primary Examiner* — Wei Y Zhen
*Assistant Examiner* — Junchun Wu
(74) *Attorney, Agent, or Firm* — Brinks Gilson & Lione (57) ABSTRACT

A method for certifying and deploying instruction code includes communicating, from a developer system, a first record to a decentralized database that indicates an availability of the instruction code. A second record is received by the developer system from the decentralized database and indicates a request to certify the instruction code, the second request having been communicated by a certification system. In response to receipt of the second record the developer system communicates a third record to the decentralized database that authorizes the certification system to retrieve the instruction code from the developer system. The developer system subsequently communicates the instruction code to the certification system. Communication of the instruction code facilitates execution of the instruction code on the certification system to thereby certify functionality of the instruction code.

20 Claims, 11 Drawing Sheets

(56) References Cited

U.S. PATENT DOCUMENTS

| | | | | |
|---|---|---|---|---|
| 8,543,842 | B2* | 9/2013 | Ginter | H04L 9/3247 |
| | | | | 713/194 |
| 9,417,869 | B2* | 8/2016 | Elder | G06F 8/65 |
| 9,515,999 | B2* | 12/2016 | Ylonen | H04L 9/14 |
| 9,612,812 | B2* | 4/2017 | Arcilla | G06F 21/57 |
| 9,911,121 | B2* | 3/2018 | Wankmueller | G06Q 20/32 |
| 10,063,529 | B2 | 8/2018 | Milazzo et al. | |
| 10,387,798 | B2 | 8/2019 | Duggan et al. | |
| 10,438,132 | B2 | 10/2019 | Duggan et al. | |
| 2002/0188848 | A1* | 12/2002 | Buttiker | G06Q 20/3821 |
| | | | | 713/175 |
| 2006/0093149 | A1* | 5/2006 | Zhu | H04L 63/0442 |
| | | | | 380/277 |
| 2006/0212703 | A1* | 9/2006 | Kojima | G06Q 20/3674 |
| | | | | 713/175 |
| 2011/0296372 | A1* | 12/2011 | Bird | G06Q 30/06 |
| | | | | 717/102 |
| 2013/0167139 | A1* | 6/2013 | Arcilla | G06F 9/44505 |
| | | | | 717/175 |
| 2015/0288528 | A1* | 10/2015 | Cho | G06F 8/61 |
| | | | | 713/158 |
| 2017/0148021 | A1* | 5/2017 | Goldstein | H04L 67/104 |
| 2017/0178027 | A1 | 6/2017 | Duggan et al. | |
| 2017/0316114 | A1 | 11/2017 | Bourhani et al. | |
| 2018/0032038 | A1 | 2/2018 | Kang et al. | |
| 2018/0089256 | A1 | 3/2018 | Wright, Sr. | |
| 2018/0157825 | A1* | 6/2018 | Eksten | H04L 9/3239 |
| 2019/0149537 | A1* | 5/2019 | Ebrahimi | H04L 63/0435 |
| | | | | 713/171 |
| 2020/0082087 | A1* | 3/2020 | Simmons | H04L 9/3234 |

OTHER PUBLICATIONS

Chapin et al., "Authorization in Trust Management: Features and Foundations", Aug. 2008, ACM, vol. 40, No. 3, Article 9 (Year: 2008).*

Hacigumus et al. "Encrypted Database Integrity in Database Service Provider Model", 2003, IBM (Year: 2003).*

Harren et al., "Using Dependent Types to Certify the Safety of Assembly Code", 2005, Springer-Verlag Berlin Heidelberg, pp. 155-170 (Year: 2005).*

"DBrain Data Collection and Labelling," downloaded Oct. 4, 2019 from the Internet at https://dbrain.io (circa 2018).

"Dbrain and the Blockchain of Artificial Intelligence," Bitcoin Magazine, downloaded on Oct. 7, 2019 from https://bitcoinmagazine.com/articles/dbrain-and-blockchain-artificial-intelligence, (Feb. 15, 2018).

"Blockchain in DevOps, Implementing transparent continuous delivery," downloaded Oct. 4, 2019 from the Internet at https://www.ey.com/ca/en/services/advisory/it/blockchain-in-devops (circa 2017).

Office Action in Australia Application No. 2019240576, dated Apr. 29, 2020, 5 pages.

* cited by examiner

| In Address | Action | Out Address |
|---|---|---|
| 0xDS-01 | Model Storage Contract Created | 0xML-01 |
| 0xDS-01 | Updated Model Version | 0xML-01 |
| 0xCO-01 | Request to become certifier | 0xML-01 |
| 0xDS-01 | Approve certifier | 0xML-01 |
| 0xCO-01 | Certify Model | 0xML-01 |
| 0xDO-01 | Request Deployment | 0xML-01 |
| 0xDS-01 | Approve Deployment | 0xML-01 |
| 0xML-01 | Certification Compensation | 0xCO-01 |
| 0xML-01 | Development Compensation | 0xDS-01 |
| 0xDS-01 | Revoke Deployment | 0xML-01 |

SYSTEM AND METHOD FOR CERTIFYING AND DEPLOYING INSTRUCTION CODE

BACKGROUND

Field

This application generally relates to computer systems. In particular, this application describes a system and method for certifying and deploying instruction code.

Description of Related Art

In developing enterprise systems, developers may rely on components/modules developed by others outside of the enterprise. For example, various off-the-shelf modules for performing statistical analysis, machine learning, natural language processing, etc. may be incorporated into the enterprise system.

Selection of such a module involves in part assessing the suitability of the module for a given application. Suitability may hinge on reliability of the module. For example, the assessment may entail determining whether the module can perform as intended without crashing. Unfortunately, there is seldom enough time to make such thorough determinations. This in turn may result in instability/unreliability of the enterprise system.

SUMMARY

In a first aspect, a method for certifying and deploying instruction code includes communicating, from a developer system, a first record to a decentralized database that indicates an availability of the instruction code. A second record is received by the developer system from the decentralized database and indicates a request to certify the instruction code. The second request is communicated by a certification system. In response to receipt of the second record, the developer system communicates a third record to the decentralized database that authorizes the certification system to retrieve the instruction code from the developer system. The developer system subsequently communicates the instruction code to the certification system. Communication of the instruction code facilitates execution of the instruction code on the certification system to thereby certify functionality of the instruction code.

In a second aspect, a system for certifying and deploying instruction code includes computer readable media and a processor in communication with the computer readable media. The computer readable media includes instruction code that, when executed by the processor, causes the processor to communicate a first record to a decentralized database that indicates an availability of the instruction code, and receive a second record from the decentralized database that indicates a request to certify the instruction code. The second request is communicated by a certification system. In response to receipt of the second record, the processor communicates a third record to the decentralized database that authorizes the certification system to retrieve the instruction code from the developer system. The processor subsequently communicates the instruction code to the certification system. Communication of the instruction code facilitates execution of the instruction code on the certification system to thereby certify functionality of the instruction code.

In a third aspect, a non-transitory computer readable media for certifying and deploying instruction code is provided. The non-transitory computer readable media includes instruction code that, when executed by a machine, causes the machine to communicate a first record to a decentralized database that indicates an availability of the instruction code, and receive a second record from the decentralized database that indicates a request to certify the instruction code. The second request is communicated by a certification system. In response to receipt of the second record, the machine communicates a third record to the decentralized database that authorizes the certification system to retrieve the instruction code from the developer system. The machine subsequently communicates the instruction code to the certification system. Communication of the instruction code facilitates execution of the instruction code on the certification system to thereby certify functionality of the instruction code.

DETAILED DESCRIPTION

The embodiments described below overcome the problems described above by providing an efficient system for certifying software modules. In general, developer, certification, and deployment systems share a distributed database of transactions that facilitate providing certification assessments and for controlling the deployment of the modules. Providing the certification assessment facilitates determining whether the module can perform as intended without crashing. This in turn facilitates a reduction in the number of potential instabilities that may arise in the enterprise system.

Figure 1:
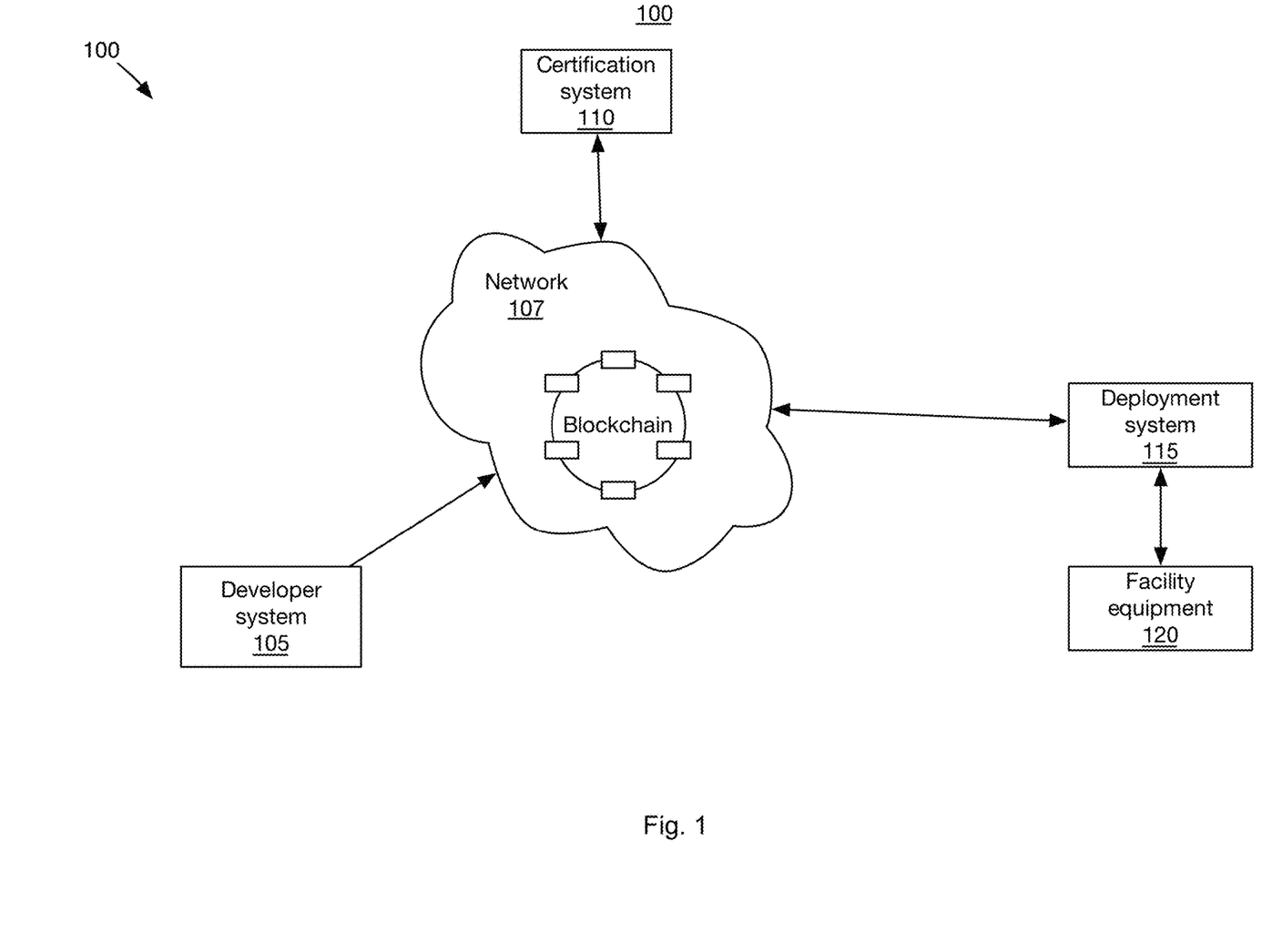
FIG. 1 illustrates an exemplary environment that includes various systems/devices that facilitate certifying and deploying instruction code.

FIG. 1 illustrates an exemplary environment 100 that includes a system for certifying and deploying instruction code. Exemplary subsystems of the environment 100 include a developer system 105, a certification system 110, a deployment system 115, and facility equipment 120. The various entities of the environment 100 may communicate with one another via a network 107, such as the Internet.

The developer system 105 corresponds to a repository of instructions code, model code, or simply models. The certification system 110 is a testing and certification system that retrieves a model from the developer system 105, facilitates testing of the model, and then facilitates certification of the model if the model passes the tests. The deployment system 115 corresponds to a system that retrieves the model from the developer system 105 and deploys the model to one or more connected systems/devices such as the facility equipment 120.

Figure 2:
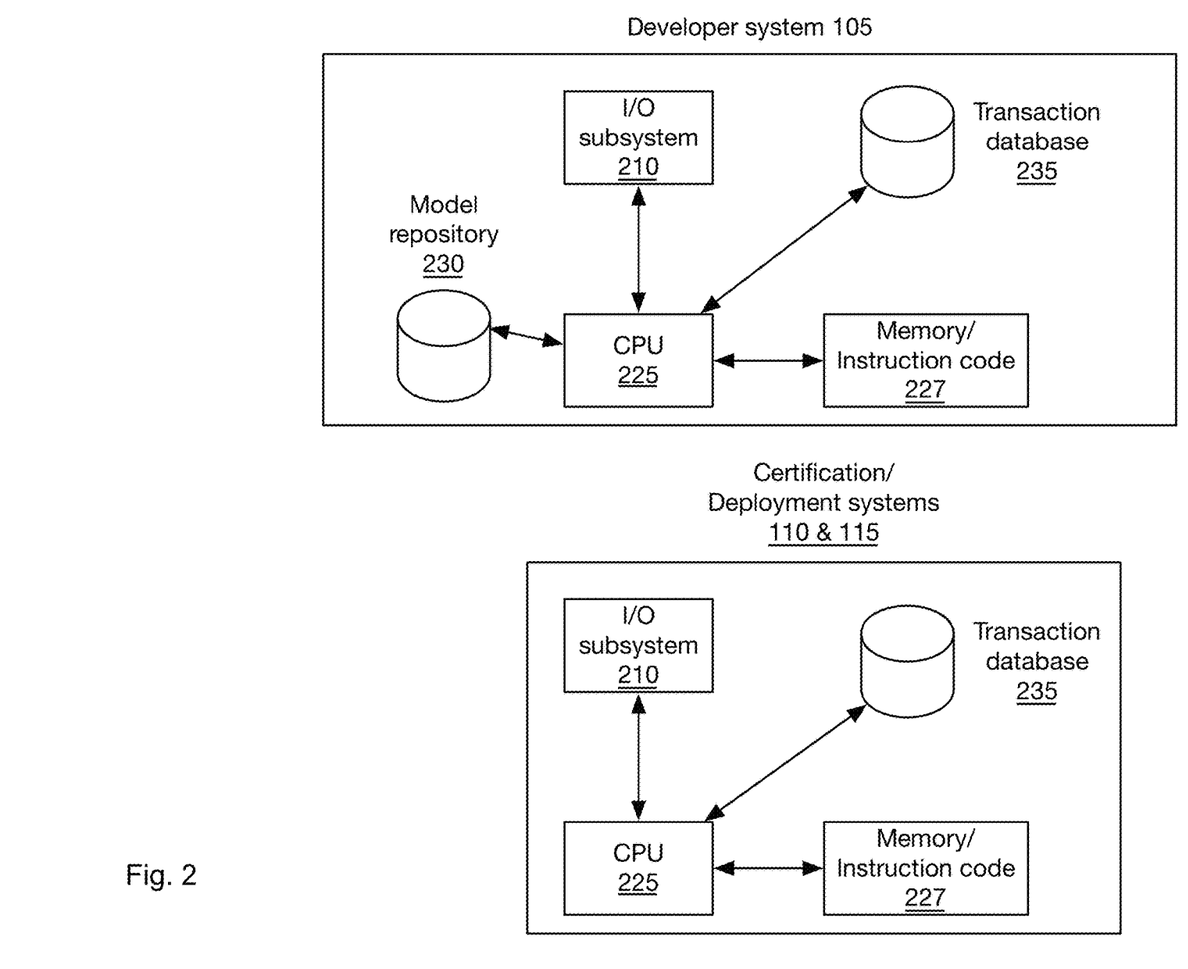
FIG. 2 illustrates a schematic diagram of a developer system, certification system, and deployment system of the environment.

FIG. 2 illustrates exemplary schematic diagrams of the developer system 105, certification system 110, and deployment system 115. Referring to the diagrams, each system includes a processor 225, input/output subsystem 210, a distributed transaction database 235, and instruction code memory 227. The developer system 105 also includes a model repository 230.

The I/O subsystem 210 of each system (105, 110, and 115) facilitates communications with other systems (105, 110, and 115) of the environment 100. In this regard, the I/O subsystem 210 may implement an API such as a SOAP-based web services API to facilitate communicating information to the other systems (105, 110, and 115). Other APIs, such as a RESTful API, may be implemented to facilitate communications between systems (105, 110, and 115).

The I/O subsystem 210 may be configured to dynamically determine the communication methodology utilized by other systems (105, 110, and 115) of the environment 100 and to communicate information to the other systems (105, 110, and 115) using the determined communication methodology. For example, the I/O subsystem 210 may determine that a first entity utilizes a RESTful API and may, therefore, communicate with the entity using a RESTful communication methodology.

The I/O subsystem 210 may implement a web browser to facilitate generating one or more web-based interfaces or screenshots that facilitate user interactions with the respective systems (105, 110, and 115). In this regard, web services may be implemented to facilitate automating some of the web-based functionality via a computer.

The CPU 225 executes instruction code stored in a memory device 227 for coordinating activities performed between the various subsystems. The processor 225 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

Records in the transaction databases 235 of each system (105, 110, and 115) are replicated with one another and collectively form a decentralized database. In one implementation, the decentralized database corresponds to a block-chain database. In this regard, the block-chain database may be utilized as a way to construct consensus around the validity of transactions, and to ensure that all changes are auditable. Stated differently, the block-chain database corresponds to a record of consensus with a cryptographic audit trail that is maintained and validated by each system (105, 110, and 115). Block chains of the block-chain database act as a way to record the order of, and validate the transactions in, the block-chain database. As will be described below, the block chains further facilitate value transfer between the parties—without the usual requirement for a trusted third party.

Each record in the transaction database 235 may be associated with an input address and an output address. Input addresses are associated/define a source of a transaction. For example, the input address associated with the developer system 105 may correspond to 0xDS-01. The input address associated with the certification system 110 may correspond to 0xC0-01. The input address associated with the deployment system 115 may correspond to 0xDO-01.

The output address is utilized to group all transactions associated with a given model. The transactions grouped according to a given output address collectively define a so-called smart contract that represents the state of requests for certification and deployment of the model, and approval of those requests. A conceptualized smart contract 505, which may be one of many smart contracts, is illustrated in the contract storage table 500 of FIGS. 5A-5F.

Briefly, each contract 505 includes fields for a uniform resource locator (URL) to the model, a hash of the model, IDs associated with one or more requesting certifiers and/or certification systems 110, IDs associated with one or more approved certifiers and/or certification systems 110, one or more certifications associated with the model, IDs associated with one or more requesting deployment systems 115, and IDs associated with one or more active deployment systems 115.

Figure 3:
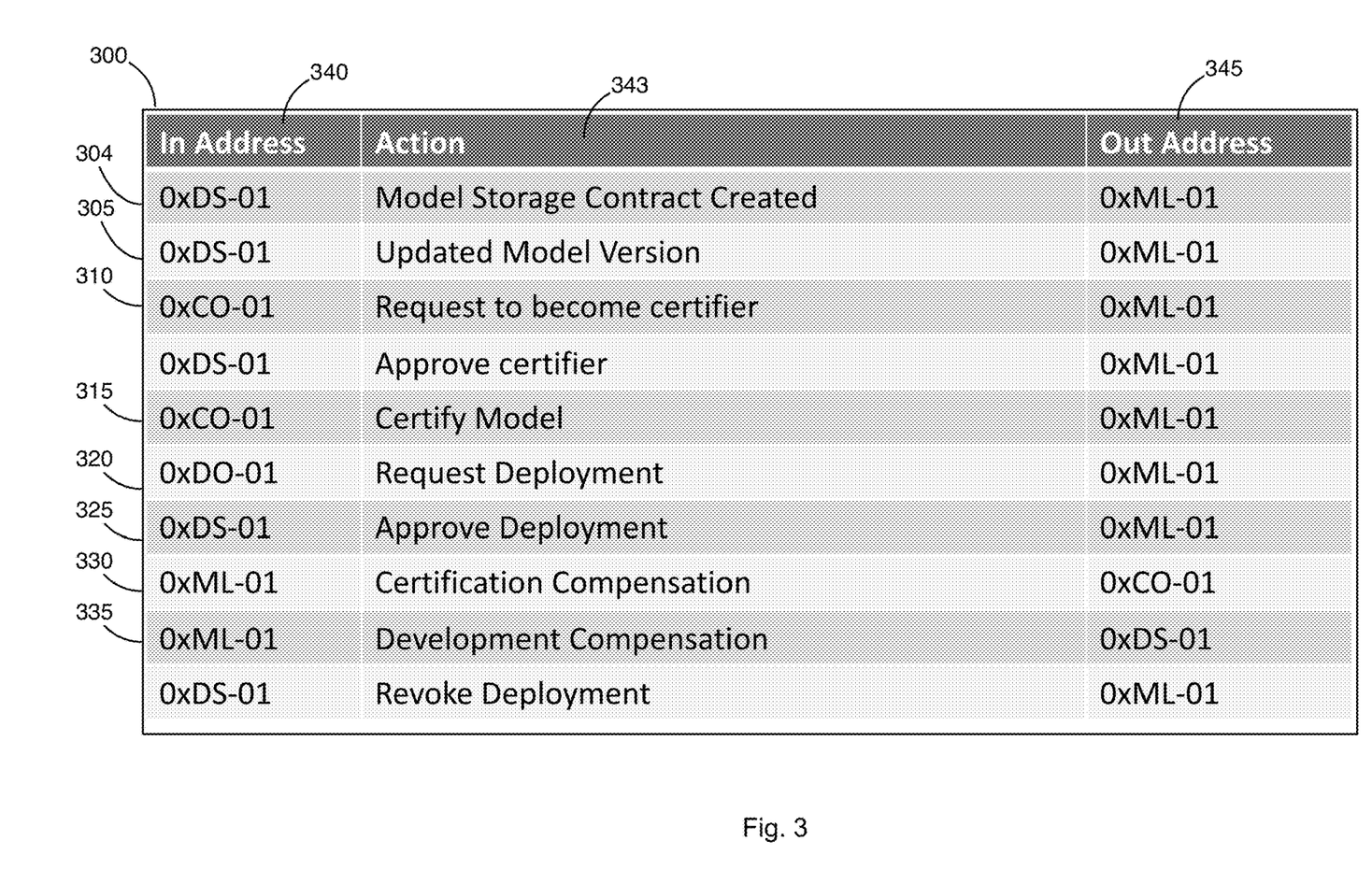
FIG. 3 illustrates an exemplary table of records that may be stored in a transaction database of each system.

FIG. 3 illustrates a table 300 of exemplary records that may be stored in the transaction database 235 of each system (105, 110, and 115). Each record is associated with an in address 340, an action 343, and an out address 345. As shown, a first record 304 to initiate model storage may be inserted into the transaction database 235 by the developer system 105. A second record 305 that indicates availability of a new version of the model for certification and deployment may be inserted into the transaction database 235 by the developer system 105. A record 310 that indicates a request to become a certifier of the model may be inserted into the transaction database 235 by the certification system 110. A record 315 that indicates certifier approval of the model may be inserted into the transaction database 235 by the certification system 110. Other records for requesting deployment (320), approving deployment (325), and providing compensation (330 and 335) may be inserted. The manner in which records are populated in the transaction database 235 is described in more detail below.

It is contemplated that any of the systems described above and/or any subsystem thereof may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 4:
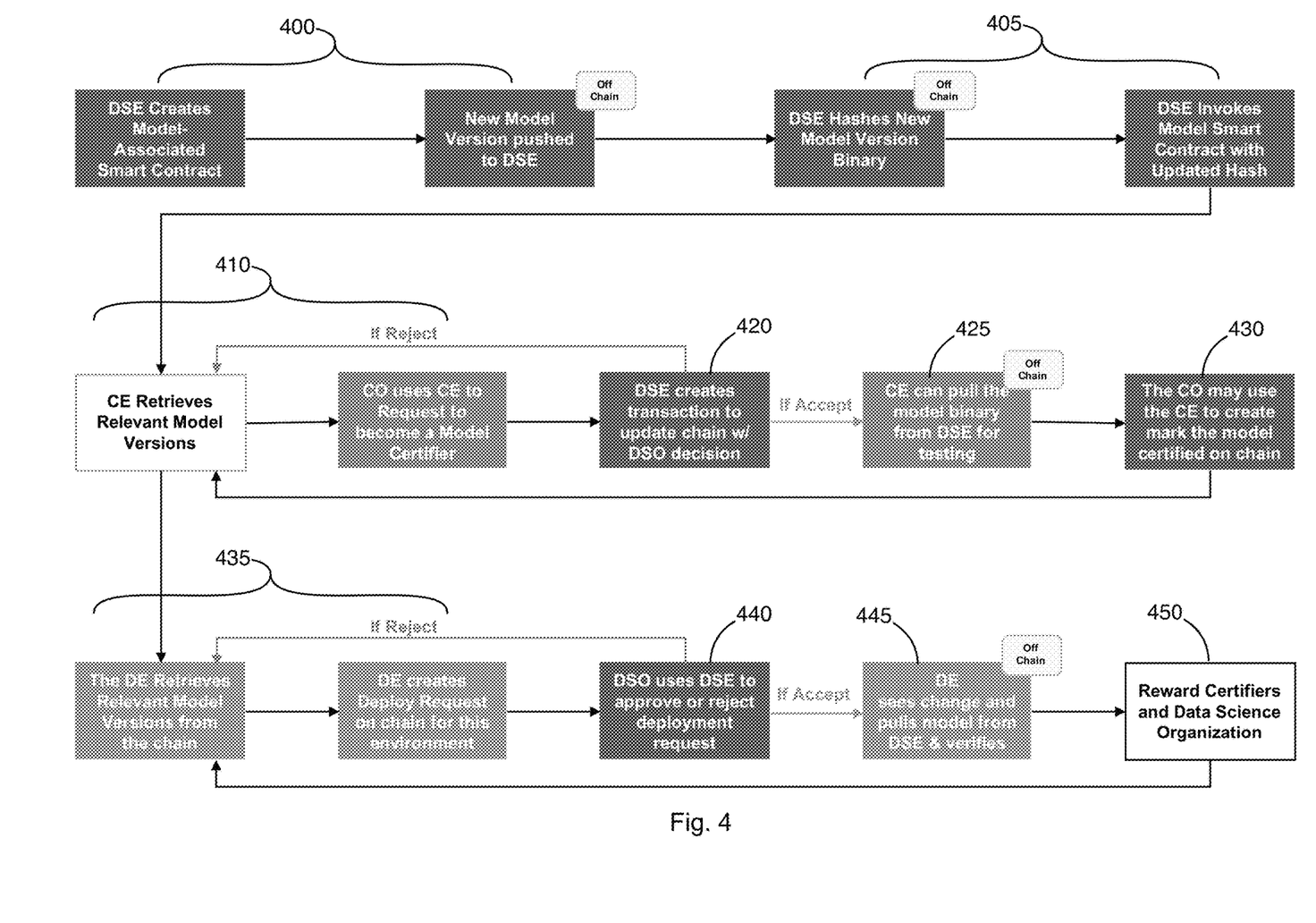
FIG. 4 illustrates various operations that may be performed by the systems of the environment.

FIG. 4 illustrates exemplary operations implemented by the different systems (105, 110, and 115) of the environment 100 that facilitate certifying and deploying a model. The various operations may be implemented via instruction code executed by respective processors 225 of the different systems (105, 110, and 115) for causing the processors 225 to perform the operations. The operations are best understood with reference to the conceptualized contract storage table 500 illustrated in FIGS. 5A-5F.

At operation 400, the developer system 105 (denoted DSE) may insert a record into the transaction database 235 that serves to instantiate a smart contract 505 associated with a new model version. For example, the developer system 105 may insert the first transaction 304 illustrated in FIG. 3 into the transaction database 235. Insertion of the first transaction may instantiate the conceptualized contract 505 illustrated in FIG. 5A.

Figure 5A:
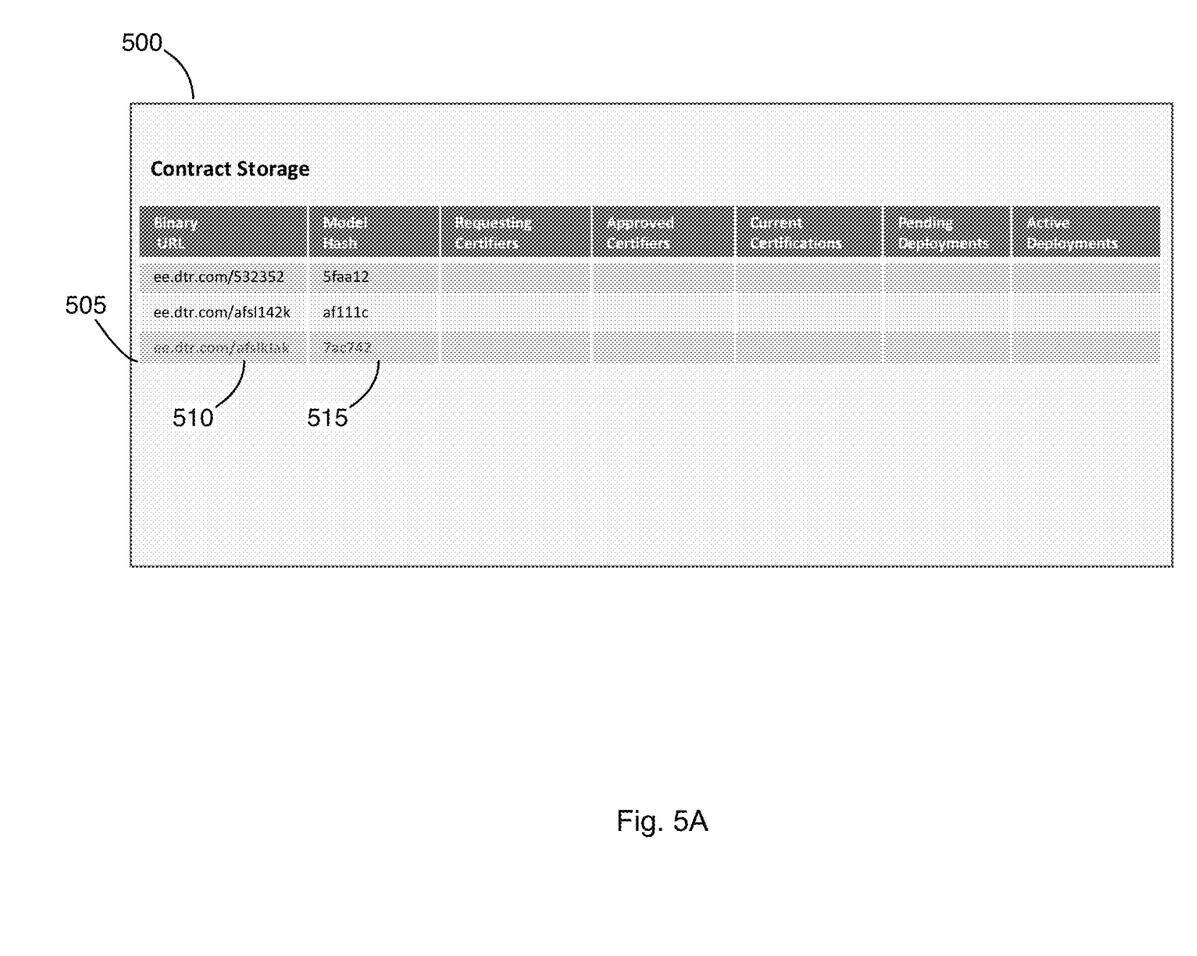
FIGS. 5A-5F illustrate conceptualized contract storage that may be defined by transactions stored in the transaction database of each system.

The developer system 105 may then insert a record into the transaction database 235 to update the contract 505 to indicate availability of a new version of the model. In this regard, the record may indicate a URL 515 associated with the model such as "ee.dtr.com/afs142k." The URL 515 may be associated with the developer system 105 or a different system that stores different versions of models. The URL 515 facilitates access to the model by approved certification and deployment systems (110 and 115).

At operation 405, the developer system 105 may generate a hash 510 of the binary instruction code associated with the model and may insert a record into the transaction database 235 to update the contract 505 with the hash 510.

Figure 5B:
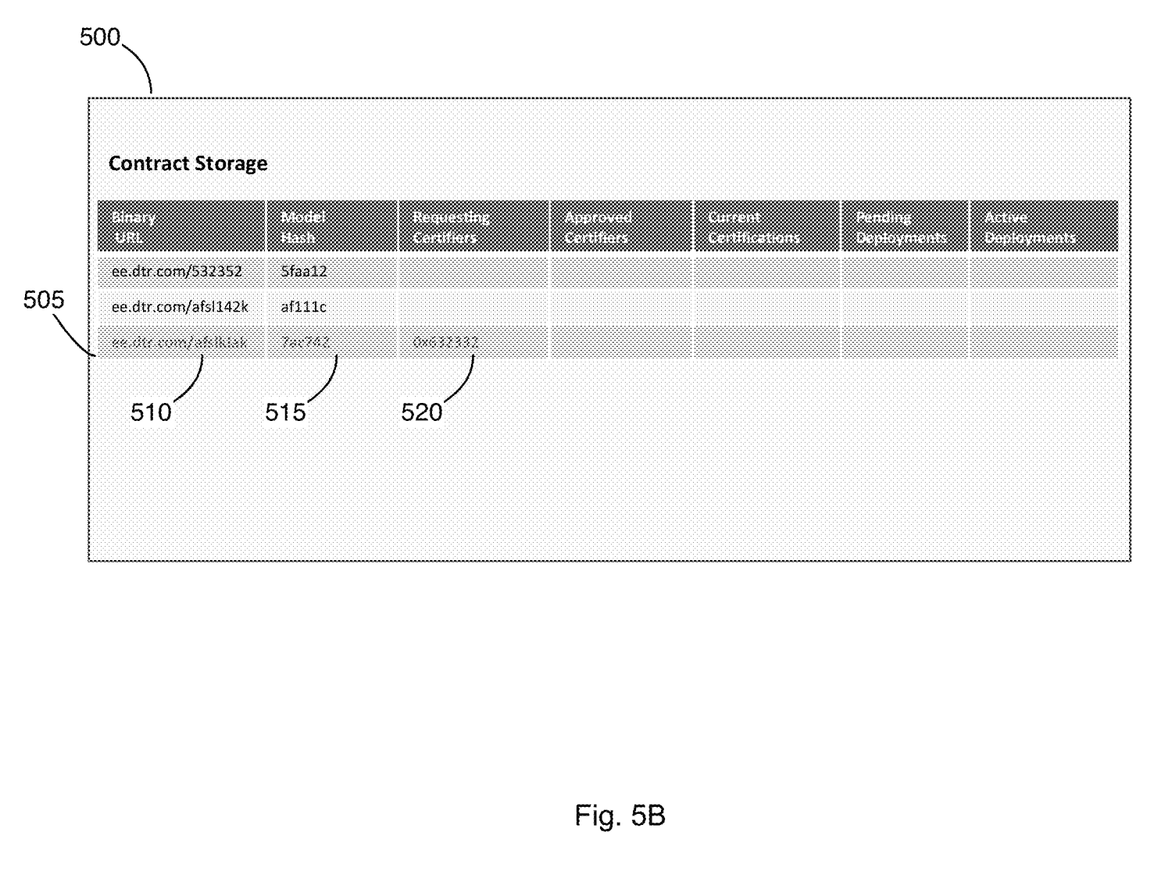

At operation 410, the certification system 110 may detect instantiation of the contract 505 associated with new model version. An operator of the certification system 110 (hereinafter CO) may utilize an interface of the certification system 110 to issue a request to become a certifier of the new model. In response, the certification system 110 may insert a record (310, FIG. 3) into the transaction database 235 for requesting permission to certify the new model associated with the contract 505. Insertion of the transaction updates a Requesting Certifiers field of the contract 505 to indicate an ID 520 associated with the CO and/or the certification system 110, as illustrated in FIG. 5B At operation 420, the developer system 105 may detect the change in the Requesting Certifiers field 525 of the contract 505 and then determine whether the certification system 110 associated with the ID should be authorized to certify the model. For example, an operator (hereinafter DSO) of the developer system 105 may be notified via an interface of the developer system 105 that a request to certify the model has been received. The ID of the requesting CO and/or the certification system 110 may be provided to the DSO.

Figure 5C:
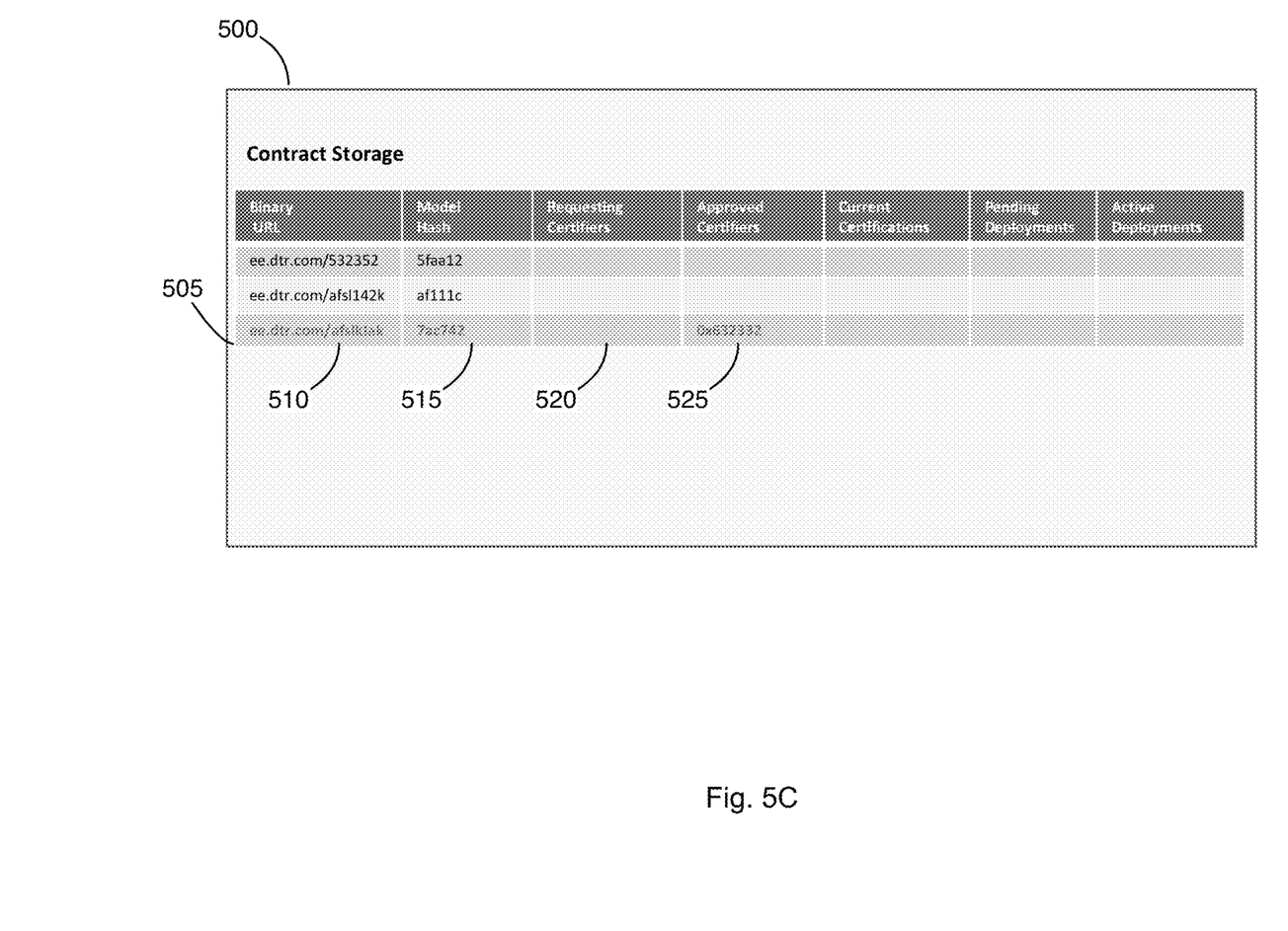

If at operation 420, the DSO accepts the request, then at block 425, the DSO may instruct the developer system 105 to send a record to the transaction database 235 to move the ID associated with the CO and/or certification system 110 from the Requesting Certifiers field 520 to the Approved Certifiers field 525 of the contract 505, as illustrated in FIG. 5C.

The developer system 105 may then communicate credentials to the approved certification system 110 to allow the certification system 110 to access the model at the URL 510 specified in the contract 505. The certification system 110 may communicate a public key to the developer system 105 to facilitate communication of an encrypted version of the model to the certification system 110.

After the certification system 110 receives the model, the CO may evaluate the model. For example, the CO may execute the model on the processor 225 of the certification system 110 or on a different system. The CO may run various test scripts on the processor 225 or system to confirm proper performance of the model.

Figure 5D:
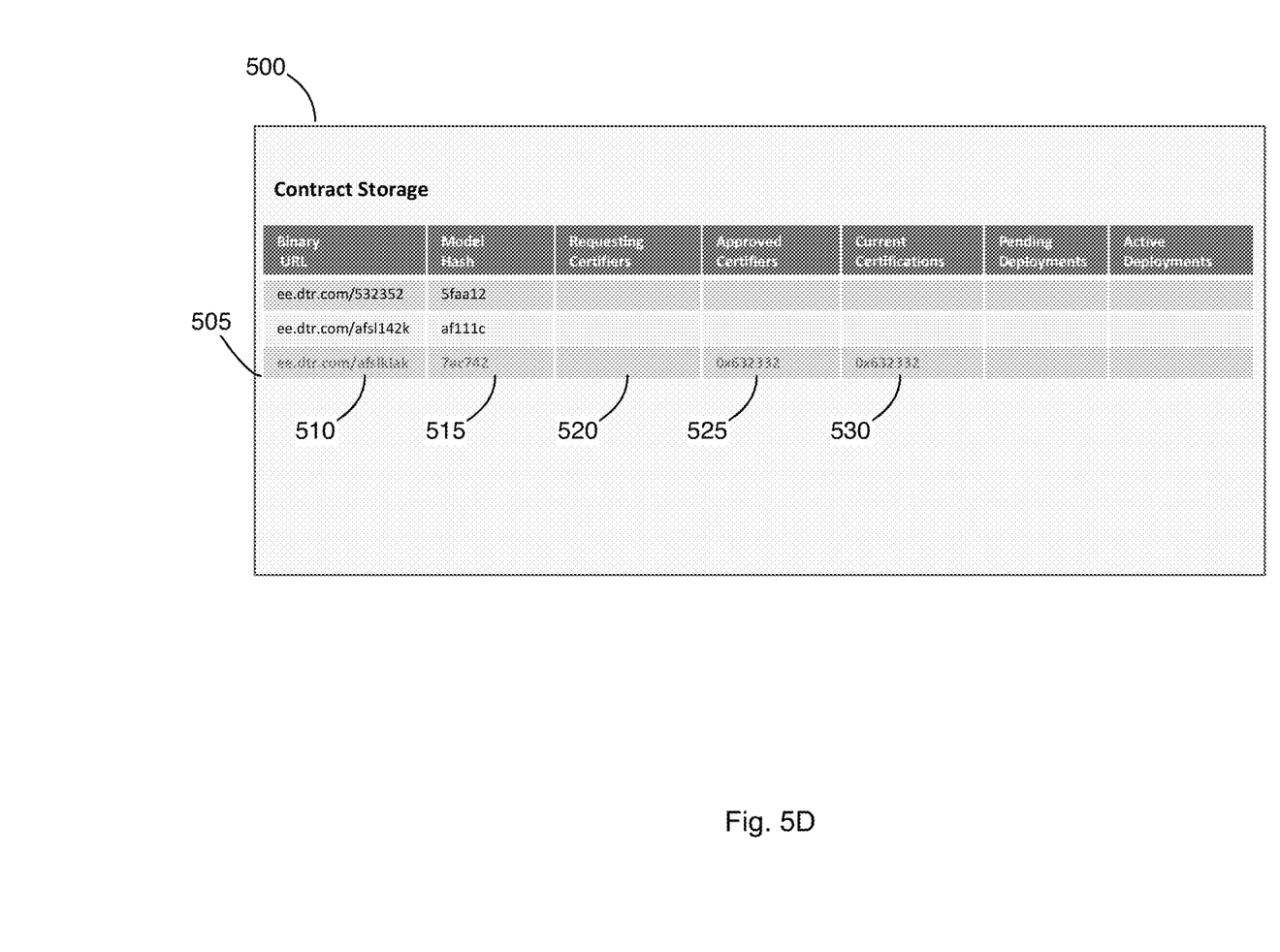

If the CO determines that all the tests of the model have passed, then at operation 430, the CO may communicate an instruction to the certification system 110 via an interface of the certification system 110 to mark the model as being certified by the CO. In response, the certification system 110 may insert a record (315, FIG. 3) into the transaction database 235 to update a Current Certifications field 530 of the contract 505 with a certificate to indicate that the model associated with the contract 505 is certified by the CO and/or the certification system 110, as illustrated in FIG. 5D. The certificate may correspond to the ID of the CO and/or the certification system 110.

Figure 5E:
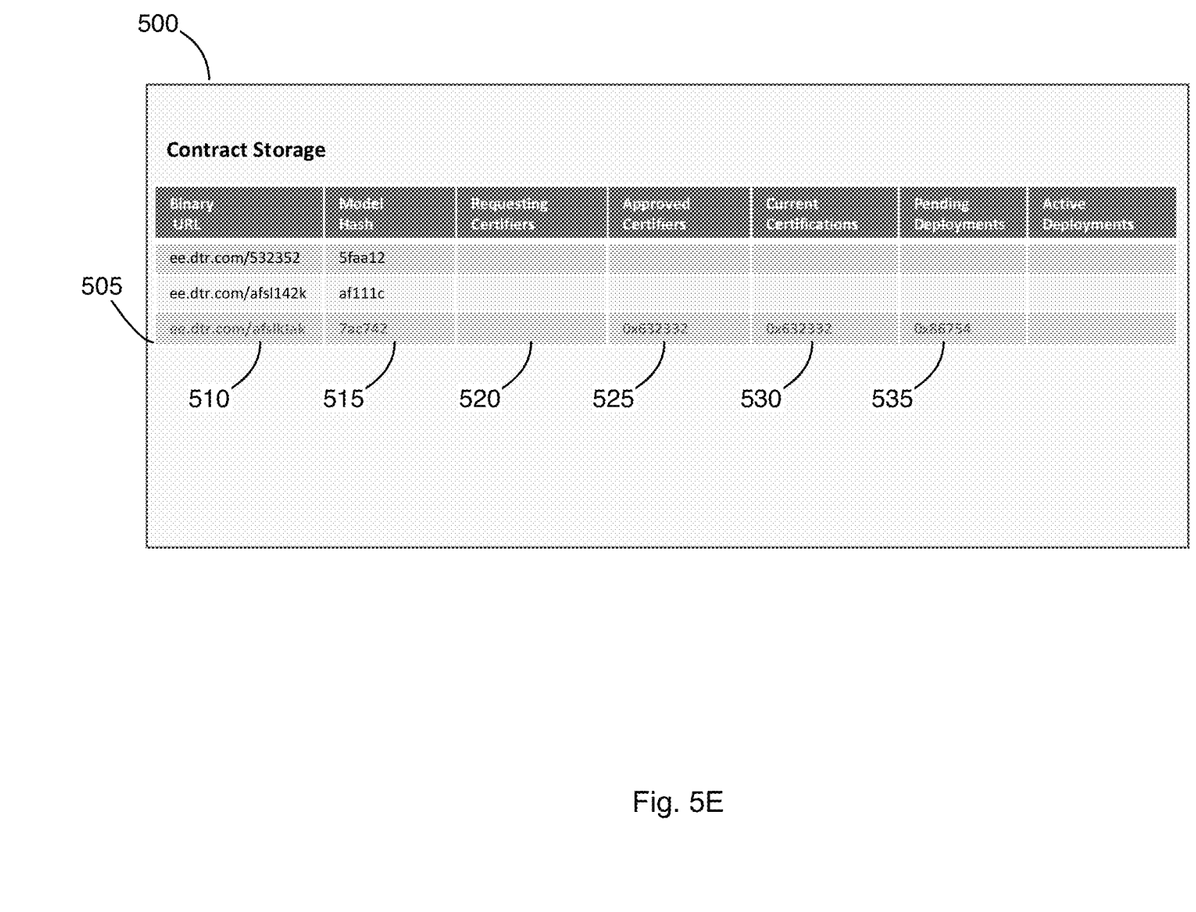

At operation 435, the deployment system 115 (denoted DE) may detect instantiation of the contract 505 associated with the new model version and note that the model has been certified by a particular CO and/or the certification system 110. The deployment system 115 may then insert a record (320, FIG. 3) into the transaction database 235 for requesting permission to deploy the model associated with the contract 505. Insertion of the transaction may update the contract 505 to indicate an ID associated with the deployment system 115 in a Pending Deployments field 535 of the contract 505, as illustrated in FIG. 5E At operation 440, the developer system 105 may detect the change in the Pending Deployments field 535 of the contract 505 and then determine whether the deployment system 115 associated with the ID should be authorized to deploy the model. For example, the DSO of the developer system 105 may be notified via an interface of the developer system 105 that a request to deploy the model has been received. The ID of the requesting deployment system 115 may be provided to the DSO.

Figure 5F:
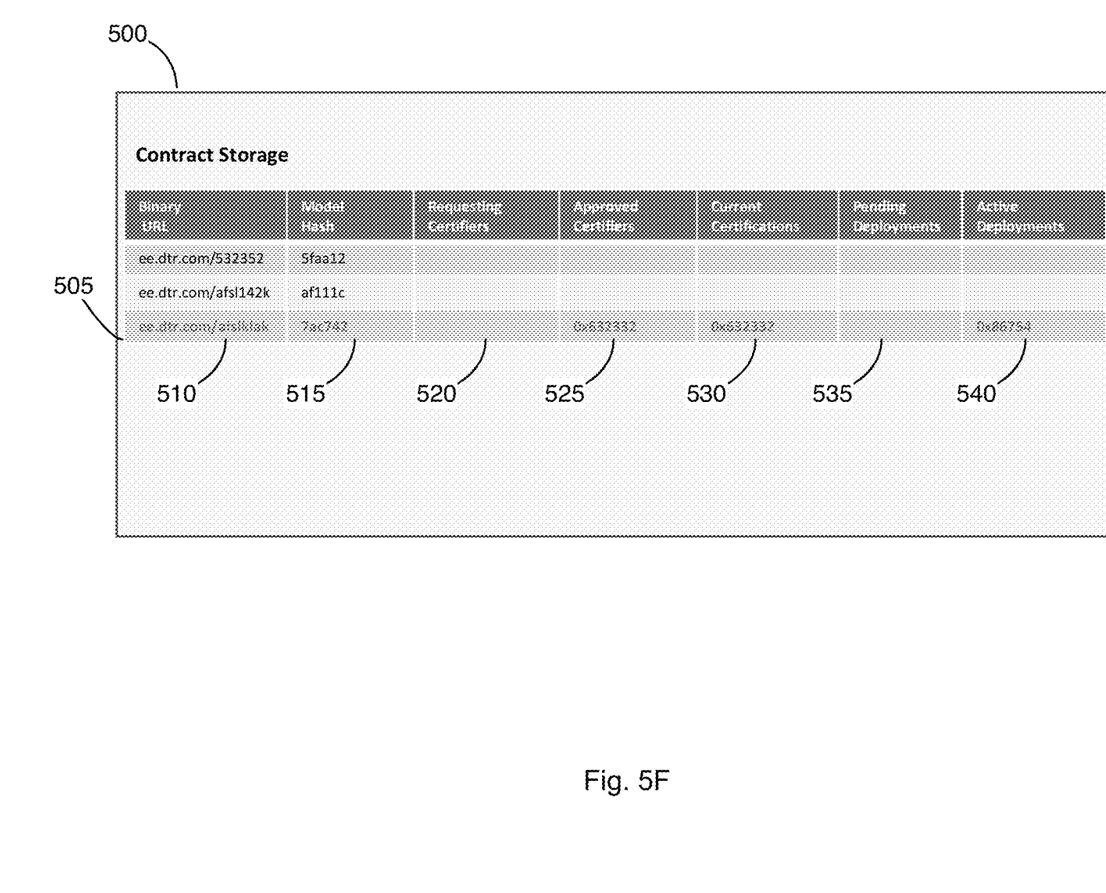

If at operation 440, the DSO accepts the request, then at block 445, the DSO may instruct the developer system 105 to send a record to the transaction database 235 to move the ID associated with the deployment system 115 from the Pending Deployments field 535 to the Active Deployments field 540 of the contract 505, as illustrated in FIG. 5F.

The developer system 105 may then communicate credentials to the approved deployment system 115 to allow the deployment system 115 to access the model at the URL 510 specified in the contract 505. The deployment system 115 may communicate a public key to the developer system 105 to facilitate communication of an encrypted version of the model to the deployment system 115.

At operation 450, the deployment system 115 may submit a transaction to the transaction database 235 to transfer monetary funds to one or more of the DSO, the developer system 105, the CO, and the certification system 110 in consideration for providing the model and certifying the model, respectively. For example, the transaction database 235 may facilitate communicating bitcoin like transactions to transfer a monetary amount to one or more of the DSO, the developer system 105, the CO, and the certification system 110.

Figure 6:
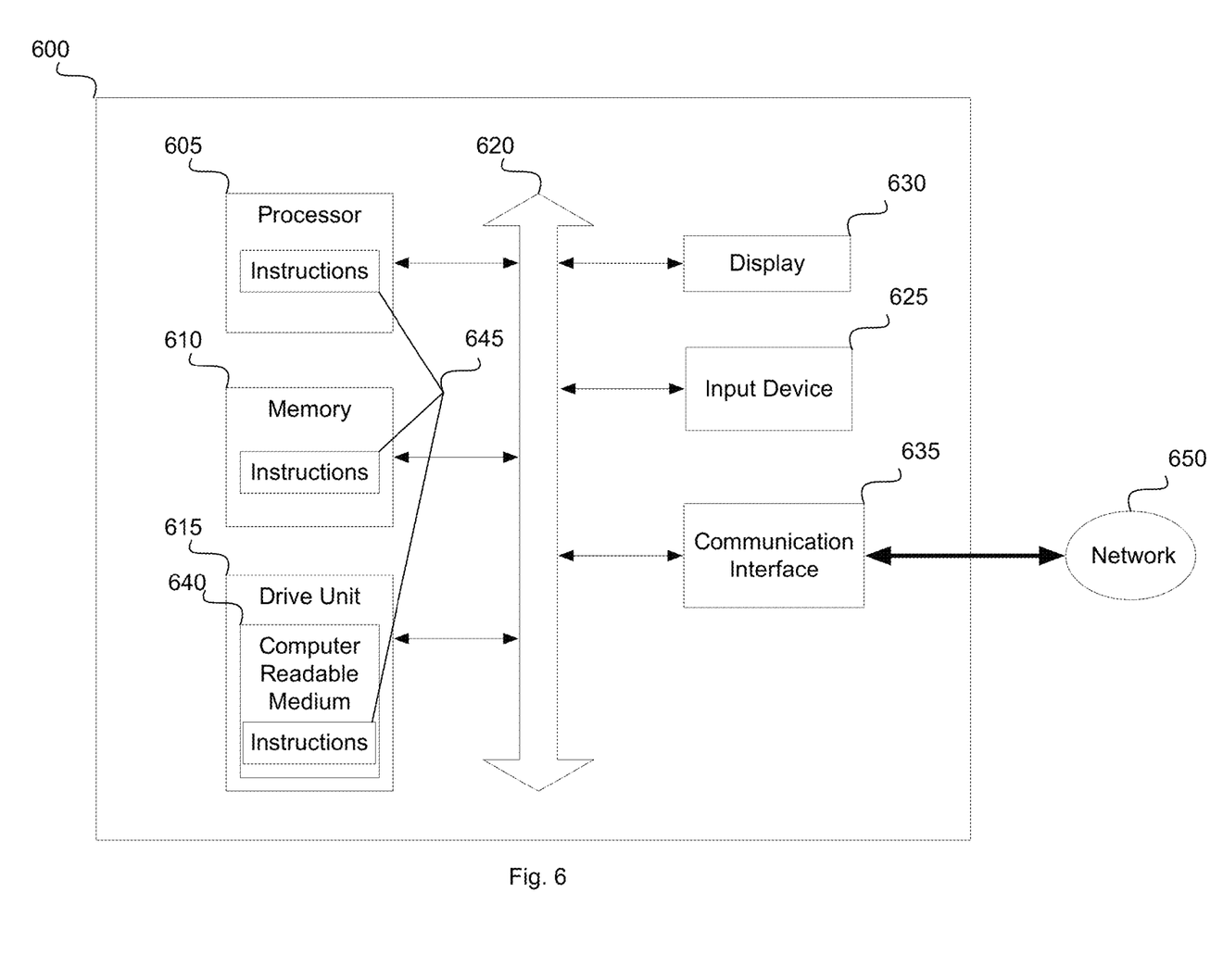
FIG. 6 illustrates an exemplary computer system that may form part of or implement the systems described in the figures or in the following paragraphs.

FIG. 6 illustrates a computer system 600 that may form part of or implement the systems, environments, devices, etc., described above. The computer system 600 may include a set of instructions 645 that the processor 605 may execute to cause the computer system 600 to perform any of the operations described above. The computer system 600 may operate as a stand-alone device or may be connected, e.g., using a network, to other computer systems or peripheral devices.

In a networked deployment, the computer system 600 may operate in the capacity of a server or as a client computer in a server-client network environment, or as a peer computer system in a peer-to-peer (or distributed) environment. The computer system 600 may also be implemented as or incorporated into various devices, such as a personal computer or a mobile device, capable of executing instructions 645 (sequential or otherwise) causing a device to perform one or more actions. Further, each of the systems described may include a collection of subsystems that individually or jointly execute a set, or multiple sets, of instructions to perform one or more computer operations.

The computer system 600 may include one or more memory devices 610 communicatively coupled to a bus 620 for communicating information. In addition, code operable to cause the computer system to perform operations described above may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see processing results produced by processor 605.

Additionally, the computer system 600 may include an input device 625, such as a keyboard or mouse or touchscreen, configured to allow a user to interact with components of system 600.

The computer system 600 may also include a disk or optical drive unit 615. The drive unit 615 may include a computer-readable medium 640 in which the instructions 645 may be stored. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 to support communications via a network 650. The network 650 may include wired networks, wireless networks, or combinations thereof. The communication interface 635 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A method for certifying and deploying instruction code, the method comprising:
communicating, from a developer system, a first record to a decentralized database that indicates an availability of the instruction code, wherein the instruction code includes a requesting certifier field and an approved certifier field;
communicating, from a certification system, a second record indicating a request to certify the instruction code to the decentralized database, wherein the second record includes an identifier associated with the certification system;
receiving, by the developer system, the second record from the decentralized database;
determining, by the developer system, whether to authorize the certification system associated with the identifier to certify the instruction code;
communicating, by the developer system, a third record to the decentralized database to move the identifier from the requesting certifier field to the approved certifier field, thereby authorizing the certification system to retrieve the instruction code from the developer system; and
subsequently communicating, by the developer system, the instruction code to the certification system;
wherein communication of the instruction code facilitates execution of the instruction code on the certification system to thereby certify functionality of the instruction code.

2. The method according to claim 1, further comprising:
subsequently receiving, by the developer system, a fourth record from the decentralized database that indicates a request to deploy the instruction code, the second request having been communicated by a deployment system;
in response to communication of the fourth record, communicating, by the developer system, a fifth record to the decentralized database that authorizes the deployment system to retrieve the instruction code from the developer system;
subsequently communicating, by the developer system, the instruction code to the deployment system; and
wherein communication of the instruction code facilitates deployment of the instruction code to a computer system by deployment system.

3. The method according to claim 2, wherein subsequent to communicating the instruction code to the deployment system, the method comprises:
communicating, by the deployment system, a record to the decentralized database that conveys a monetary amount to one or both of the developer system and the certification system.

4. The method according to claim 2, wherein prior to receiving the fourth record that indicates a request to deploy the instruction code, the method comprises:
communicating, by the certification system, a record to the decentralized database that indicates certification of the instruction code.

5. The method according to claim 1, wherein the decentralized database corresponds to a blockchain database, wherein the decentralized database is replicated at the developer system, the certification system, and the deployment system.

6. The method according to claim 1, wherein the first record specifies a uniform resource locator (URL) to the instruction code, and a hash of the instruction code.

7. The method according to claim 6, wherein communication of the instruction code to the certification system further comprises:
receiving, at the developer system, a download request to download the instruction code, wherein the download request is communicated from the certification system via the URL and specifies a public encryption key of the certification system;
encrypting, by the developer system, the instruction code with the public encryption key; and
communicating, by the developer system, the encrypted instruction code to the certification system.

8. A system for certifying and deploying instruction code, the system comprising:
- non-transitory computer readable media; and
- a processor in communication with the non-transitory computer readable media, wherein the non-transitory computer readable media includes instruction code executable by the processor for causing the processor to perform acts comprising:
  - communicating a first record to a decentralized database that indicates an availability of the instruction code, wherein the instruction code includes a requesting certifier field and an approved certifier field;
  - communicating a second record indicating a request to certify the instruction code to the decentralized database, wherein the second record includes an identifier associated with the certification system;
  - receiving the second record from the decentralized database;
  - determining whether to authorize the certification system associated with the identifier to certify the instruction code;
  - communicating a third record to the decentralized database to move the identifier from the requesting certifier field to the approved certifier field, thereby authorizing the certification system to retrieve the instruction code from the developer system; and
  - subsequently communicating the instruction code to the certification system;
  - wherein communication of the instruction code facilitates execution of the instruction code on the certification system to thereby certify functionality of the instruction code.

9. The system according to claim 8, wherein the instruction code causes the processor to perform acts comprising:
- subsequently receiving a fourth record from the decentralized database that indicates a request to deploy the instruction code, the second request having been communicated by a deployment system;
- in response to communication of the fourth record, communicating a fifth record to the decentralized database that authorizes the deployment system to retrieve the instruction code from the developer system;
- subsequently communicating the instruction code to the deployment system; and
- wherein communication of the instruction code facilitates deployment of the instruction code to a computer system by deployment system.

10. The system according to claim 9, wherein subsequent to communicating the instruction code to the deployment system, the deployment system communicates a record to the decentralized database that conveys a monetary amount to one or both of the developer system and the certification system.

11. The system according to claim 9, wherein prior to receiving the fourth record that indicates a request to deploy the instruction code, the certification system communicates a record to the decentralized database that indicates certification of the instruction code.

12. The system according to claim 8, wherein the decentralized database corresponds to a blockchain database, wherein the decentralized database is replicated at the developer system, the certification system, and the deployment system.

13. The system according to claim 8, wherein the first record specifies a uniform resource locator (URL) to the instruction code, and a hash of the instruction code.

14. The system according to claim 13, wherein in communicating the instruction code to the certification system, the instruction code causes the processor to perform acts comprising:
- receiving a download request to download the instruction code, wherein the download request is communicated from the certification system via the URL and specifies a public encryption key of the certification system;
- encrypting the instruction code with the public encryption key; and
- communicating the encrypted instruction code to the certification system.

15. Non-transitory computer readable media for certifying and deploying instruction code, wherein the non-transitory computer readable media includes instruction code executable by a machine for causing the machine to perform acts comprising:
- communicating a first record to a decentralized database that indicates an availability of the instruction code, wherein the instruction code includes a requesting certifier field and an approved certifier field;
- communicating a second record indicating a request to certify the instruction code to the decentralized database, wherein the second record includes an identifier associated with the certification system;
- receiving the second record from the decentralized database;
- determining whether to authorize the certification system associated with the identifier to certify the instruction code;
- communicating a third record to the decentralized database to move the identifier from the requesting certifier field to the approved certifier field, thereby authorizing the certification system to retrieve the instruction code from the developer system; and
- subsequently communicating the instruction code to the certification system;
- wherein communication of the instruction code facilitates execution of the instruction code on the certification system to thereby certify functionality of the instruction code.

16. The non-transitory computer readable media according to claim 15, wherein the instruction code causes the machine to perform acts comprising:
- subsequently receiving a fourth record from the decentralized database that indicates a request to deploy the instruction code, the second request having been communicated by a deployment system;
- in response to communication of the fourth record, communicating a fifth record to the decentralized database that authorizes the deployment system to retrieve the instruction code from the developer system;
- subsequently communicating the instruction code to the deployment system; and
- wherein communication of the instruction code facilitates deployment of the instruction code to a computer system by deployment system.

17. The non-transitory computer readable media according to claim 16, wherein subsequent to communicating the instruction code to the deployment system, the deployment system communicates a record to the decentralized database that conveys a monetary amount to one or both of the developer system and the certification system.

18. The non-transitory computer readable media according to claim 16, wherein prior to receiving the fourth record that indicates a request to deploy the instruction code, the certification system communicates a record to the decentralized database that indicates certification of the instruction code.

19. The non-transitory computer readable media according to claim 15, wherein the decentralized database corresponds to a blockchain database, wherein the decentralized database is replicated at the developer system, the certification system, and the deployment system.

20. The non-transitory computer readable media according to claim 15, wherein the first record specifies a uniform resource locator (URL) to the instruction code, and a hash of the instruction code.

* * * * *